US012000611B2

United States Patent
Shimamura et al.

(10) Patent No.: US 12,000,611 B2
(45) Date of Patent: Jun. 4, 2024

(54) AIR CONDITIONER

(71) Applicant: FUJITSU GENERAL LIMITED, Kanagawa (JP)

(72) Inventors: Yutaka Shimamura, Kanagawa (JP); Takashi Matsuzaki, Kanagawa (JP); Toshihiko Watanabe, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 245 days.

(21) Appl. No.: 17/761,431

(22) PCT Filed: Sep. 18, 2020

(86) PCT No.: PCT/JP2020/035415
§ 371 (c)(1),
(2) Date: Mar. 17, 2022

(87) PCT Pub. No.: WO2021/054431
PCT Pub. Date: Mar. 25, 2021

(65) Prior Publication Data
US 2022/0349611 A1    Nov. 3, 2022

(30) Foreign Application Priority Data

Sep. 20, 2019   (JP) ................................ 2019-171664

(51) Int. Cl.
*F24F 11/74*    (2018.01)
(52) U.S. Cl.
CPC .................................... *F24F 11/74* (2018.01)
(58) Field of Classification Search
CPC ...... F24F 11/74; F24F 11/745; F24F 2110/10; F24F 2110/12; F24F 2140/10;
(Continued)

(56) References Cited

U.S. PATENT DOCUMENTS

| 2021/0404689 | A1* | 12/2021 | Kim | .......................... F24F 11/64 |
| 2022/0146123 | A1* | 5/2022 | Fujimoto | ................. F24F 3/001 |

FOREIGN PATENT DOCUMENTS

| CN | 104279690 | A | 1/2015 |
| CN | 107401801 | A | 11/2017 |

(Continued)

OTHER PUBLICATIONS

Nov. 10, 2020, International Search Report issued for related PCT Application No. PCT/JP2020/035415.

(Continued)

*Primary Examiner* — Nelson J Nieves
(74) *Attorney, Agent, or Firm* — Paratus Law Group, PLLC

(57) ABSTRACT

In an air conditioner of the present embodiment capable of selecting either a fan rotation speed determined on the basis of a static pressure value and an air volume or a required fan rotation speed, motor control means determines, on the basis of the static pressure Pt, the fan rotation speed Rm of a fan motor that provides the air volume Av required by the user, and transmits the determined fan rotation speed Rm to an indoor unit control means. When the fan rotation speed Rm received from the motor control means is a prohibited rotation speed, the indoor unit control means transmits a correction fan rotation speed different from the prohibited rotation speed to the motor control means, and the motor control means drives the fan motor at the received correction fan rotation speed.

2 Claims, 8 Drawing Sheets

(58) Field of Classification Search
CPC .... F24F 2140/12; F24F 2140/20; F24F 11/49; F24F 11/77
See application file for complete search history.

(56) References Cited

FOREIGN PATENT DOCUMENTS

| | | |
|---|---|---|
| JP | H08-247086 A | 9/1996 |
| JP | H10-009653 A | 1/1998 |
| JP | 2011-133174 A | 7/2011 |
| JP | 2016-166698 A | 9/2016 |

OTHER PUBLICATIONS

Nov. 10, 2020, International Search Opinion issued for related PCT Application No. PCT/JP2020/035415.

\* cited by examiner

AIR CONDITIONER

CROSS REFERENCE TO PRIOR APPLICATION

This application is a National Stage Patent Application of PCT International Patent Application No. PCT/JP2020/035415 (filed on Sep. 18, 2020) under 35 U.S.C. § 371, which claims priority to Japanese Patent Application No. 2019-171664 (filed on Sep. 20, 2019), which are all hereby incorporated by reference in their entirety.

TECHNICAL FIELD

The present invention relates to an air conditioner, and more particularly, to an air conditioner including a duct-type indoor unit coupled to a duct through which conditioned air to be carried into a room flows.

BACKGROUND ART

As an indoor unit of an air conditioner, there is a duct-type indoor unit in which a heat exchanger is disposed on a leeward side of a blower fan. The duct-type indoor unit is provided in a space behind a ceiling of a building, and is coupled to an outdoor unit provided outdoors by a refrigerant pipe. In addition, an absorption port of the duct-type indoor unit and an absorption port provided on a ceiling surface of a room are coupled by an absorption duct, and an air outlet of the duct-type indoor unit and an air outlet provided on the ceiling surface of the room are coupled by an air outlet duct. In such an air conditioner including the duct-type indoor unit, indoor air is taken into a housing of the duct-type indoor unit via the absorption port by driving the blower fan, the taken indoor air and a refrigerant circulating between the outdoor unit and the duct-type indoor unit are heated or cooled by being subjected to heat exchange in the heat exchanger of the indoor unit, and the air subjected to the heat exchange is blown into the room via the air outlet by driving the blower fan, thereby cooling or heating the room.

In the air conditioner including the duct-type indoor unit as described above, a static pressure value varies depending on an environment in which the duct-type indoor unit is provided, more specifically, a difference in a length or an outer diameter dimension of the air outlet duct coupled to the air outlet of the duct-type indoor unit, and if the static pressure value varies, an air volume blown into the room varies even if a motor of the blower fan (hereinafter, referred to as a fan motor) is driven at the same rotation speed. Therefore, there has been proposed an air conditioner in which, in order to set an air volume to be blown into a room to an air volume required by a user, for example, set the air volume to a weak air volume, a medium air volume, or a strong air volume, relationship information indicating a relationship among a static pressure value, an air volume, and a rotation speed of a fan motor is obtained and stored in advance, a rotation speed of the fan motor that implements the air volume required by the user is obtained at a static pressure value at a time point at which the rotation speed of the fan motor is determined by using the relationship information, and the blower fan is driven at the obtained rotation speed of the fan motor (Patent Literature 1).

CITATION LIST

Patent Literature

Patent Literature 1: JP-A-2016-166698

SUMMARY OF INVENTION

Technical Problem

When a rotation speed of the fan motor of the blower fan (hereinafter, referred to as a fan rotation speed) for implementing the air volume required by the user is determined in consideration of the static pressure value at the time point at which the rotation speed of the fan motor is determined as in the air conditioner including the duct-type indoor unit as described above, the following problem may occur.

As described above, in the case where the fan rotation speed is determined based on the static pressure value and the air volume, when the blower fan is driven at the determined fan rotation speed, the housing of the duct-type indoor unit may resonate with the blower fan. Normally, when the resonance of the housing occurs due to driving of the blower fan, the fan rotation speed is changed to a rotation speed at which the resonance does not occur, but if the fan rotation speed is changed unnecessarily in order to prevent occurrence of the resonance, there is a problem that the air volume required by the user cannot be implemented.

The present invention has been made to solve the above-described problems, and an object of the present invention is to provide an air conditioner capable of preventing occurrence of resonance of a housing while implementing an air volume required by a user.

Solution to Problem

In order to solve the above problem, an air conditioner of the present invention includes: an indoor unit including an indoor heat exchanger, an indoor unit fan including a fan motor, and a static pressure sensor configured to detect a static pressure value of air blown out from the indoor unit fan; and a controller configured to control the fan motor. The controller uses the static pressure value detected by the static pressure sensor and an air volume of conditioned air blown out from the indoor unit required by a user to determine a first fan rotation speed, which is a rotation speed of the indoor unit fan that implements the air volume, when the determined first fan rotation speed is not a prohibited rotation speed at which resonance occurs in the indoor unit, the controller controls the fan motor so that the indoor unit fan rotates at the first fan rotation speed, and when the determined first fan rotation speed is the prohibited rotation speed, the controller controls the fan motor so that the indoor unit fan rotates at a second fan rotation speed different from the first fan rotation speed.

Advantageous Effects of Invention

In the air conditioner of the present invention as described above, when the first fan rotation speed determined based on the static pressure value and the air volume is the prohibited rotation speed, the indoor unit fan is driven at the second fan rotation speed different from the first fan rotation speed. Therefore, occurrence of resonance of a housing can be prevented while an air volume required by a user can be implemented.

BRIEF DESCRIPTION OF DRAWINGS

FIGS. 6A and 6B shows diagrams illustrating processes performed by controllers that are related to the control of the indoor fan, in which FIG. 6A is a flowchart related to a process performed by the indoor unit controller, and FIG. 6B is a flowchart related to a process performed by the motor controller.

DESCRIPTION OF EMBODIMENTS

Hereinafter, an embodiment of the present invention will be described in detail with reference to the accompanying drawings. As the embodiment, an air conditioner will be described as an example in which ten duct-type indoor units are coupled in parallel to an outdoor unit, and all the duct-type indoor units perform a cooling operation or a heating operation at the same time. The present invention is not limited to the following embodiment, and various modifications can be made without departing from the gist of the present invention. In the following description, the duct-type indoor unit is simply referred to as an "indoor unit" unless otherwise specified.

Embodiment

Figure 1A:
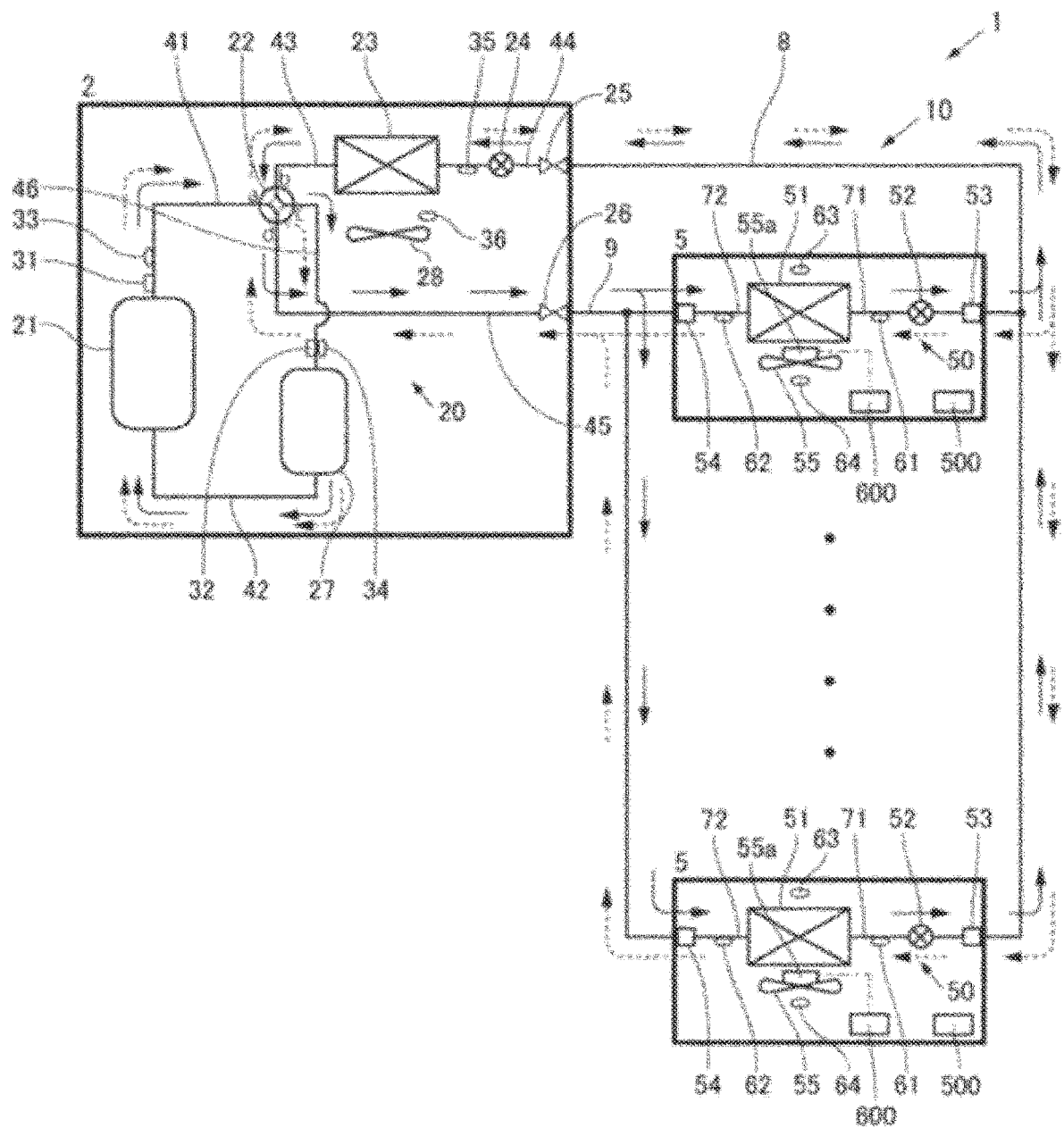
FIG. 1A is a diagram of a refrigerant circuit of an air conditioner according to an embodiment of the present invention.

As shown in FIG. 1A, an air conditioner 1 according to the present embodiment includes one outdoor unit 2, and ten duct-type indoor units 5 (only two thereof are shown in FIG. 1A) coupled in parallel to the outdoor unit 2 via a liquid pipe 8 and a gas pipe 9. More specifically, a closing valve 25 of the outdoor unit 2 and a liquid pipe coupling portion 53 of each indoor unit 5 are coupled by the liquid pipe 8. In addition, a closing valve 26 of the outdoor unit 2 and a gas pipe coupling portion 54 of each indoor unit 5 are coupled by the gas pipe 9. In this manner, the outdoor unit 2 and the ten indoor units 5 are coupled by the liquid pipe 8 and the gas pipe 9 to form a refrigerant circuit 10 of the air conditioner 1.

<Configuration of Outdoor Unit>

First, the outdoor unit 2 will be described. The outdoor unit 2 includes a compressor 21, a four-way valve 22, an outdoor heat exchanger 23, an outdoor unit expansion valve 24, the closing valve 25 to which the liquid pipe 8 is coupled, the closing valve 26 to which the gas pipe 9 is coupled, an accumulator 27, and an outdoor unit fan 28. These units other than the outdoor unit fan 28 are coupled to each other by respective refrigerant pipes described in detail below to form an outdoor unit refrigerant circuit 20 that forms a part of the refrigerant circuit 10.

The compressor 21 is a variable-capacity-type compressor that can change operation capacity by being driven by a motor (not shown) whose rotation speed is controlled by an inverter. A refrigerant discharge side of the compressor 21 is coupled to a port a of the four-way valve 22, which will be described below, by a discharge pipe 41. A refrigerant absorption side of the compressor 21 is coupled to a refrigerant outflow side of the accumulator 27 by an absorption pipe 42.

The four-way valve 22 is a valve for switching a direction in which a refrigerant flows in the refrigerant circuit 10, and includes four ports a, b, c, d. As described above, the port a is coupled to the refrigerant discharge side of the compressor 21 by the discharge pipe 41. The port b is coupled to one of refrigerant entry/exit openings of the outdoor heat exchanger 23 by a refrigerant pipe 43. The port c is coupled to a refrigerant inflow side of the accumulator 27 by a refrigerant pipe 46. Then, the port d is coupled to the closing valve 26 by an outdoor unit gas pipe 45.

The outdoor heat exchanger 23 performs heat exchange between the refrigerant and ambient air that is taken into the outdoor unit 2 by rotation of the outdoor fan 28, which will be described below. As described above, the port b of the four-way valve 22 is coupled to one of the refrigerant entry/exit openings of the outdoor heat exchanger 23 by the refrigerant pipe 43. The other one of the refrigerant entry/exit openings of the outdoor heat exchanger 23 is coupled to the closing valve 25 by an outdoor unit liquid pipe 44. The outdoor heat exchanger 23 functions as a condenser when the air conditioner 1 performs the cooling operation, and functions as an evaporator when the air conditioner 1 performs the heating operation.

The outdoor unit expansion valve 24 is provided in the outdoor unit liquid pipe 44. The outdoor unit expansion valve 24 is an electronic expansion valve driven by a pulse motor (not shown), and an amount of the refrigerant flowing into the outdoor heat exchanger 23 or an amount of the refrigerant flowing out of the outdoor heat exchanger 23 is adjusted by adjusting an opening degree according to the number of pulses given to the pulse motor. When the air conditioner 1 performs the heating operation, the opening degree of the outdoor unit expansion valve 24 is adjusted, so that a refrigerant superheated degree on a refrigerant exit side of the outdoor heat exchanger becomes a target refrigerant superheated degree, which will be described later. The opening degree of the outdoor unit expansion valve 24 is fully opened when the cooling operation is performed.

As described above, the refrigerant inflow side of the accumulator 27 is coupled to the port c of the four-way valve 22 by the refrigerant pipe 46, and the refrigerant outflow side of the accumulator 27 is coupled to the refrigerant absorption side of the compressor 21 by the absorption pipe 42. The accumulator 27 separates the refrigerant flowing into the accumulator 27 from the refrigerant pipe 46 into a gas refrigerant and a liquid refrigerant, and absorbs only the gas refrigerant into the compressor 21.

The outdoor unit fan 28 is formed of a resin material, and is disposed near the outdoor heat exchanger 23. The outdoor unit fan 28 is rotated by a fan motor (not shown), so that ambient air is taken into the outdoor unit 2 from an absorption port (not shown) provided in a housing of the outdoor unit 2, and the ambient air subjected to the heat exchange with the refrigerant in the outdoor heat exchanger 23 is discharged out of the outdoor unit 2 from an air outlet (not shown) provided in the housing of the outdoor unit 2.

In addition to the configuration described above, various sensors are provided in the outdoor unit 2. As shown in FIG. 1A, the discharge pipe 41 is provided with a discharge pressure sensor 31 that detects a discharge pressure, which is a pressure of the refrigerant discharged from the compressor 21, and a discharge temperature sensor 33 that detects a temperature of the refrigerant discharged from the compressor 21. Near the refrigerant inflow port of the accumulator 27 in the refrigerant pipe 46, an absorption pressure sensor 32 that detects an absorption pressure, which is a pressure of the refrigerant absorbed into the compressor 21, and an absorption temperature sensor 34 that detects a temperature of the refrigerant absorbed into the compressor 21 are provided.

A heat exchange temperature sensor 35 for detecting a temperature of the refrigerant flowing into the outdoor heat exchanger 23 or a temperature of the refrigerant flowing out of the outdoor heat exchanger 23 is provided between the outdoor heat exchanger 23 and the outdoor unit expansion valve 24 in the outdoor unit liquid pipe 44. An ambient air temperature sensor 36 that detects a temperature of the ambient air flowing into the outdoor unit 2, that is, an ambient air temperature, is provided near the absorption port (not shown) of the outdoor unit 2.

In addition, the outdoor unit 2 is provided with an outdoor unit controller (not shown). The outdoor unit controller periodically (for example, every 30 seconds) takes in detection values of the various sensors. In addition, a signal including operation information transmitted from each indoor unit 5 is input to the outdoor unit controller. The outdoor unit controller adjusts the opening degree of the outdoor unit expansion valve 24 and performs drive control on the compressor 21 and the outdoor unit fan 28 based on the input various kinds of information.

<Configuration of Indoor Unit=

Figure 1B:
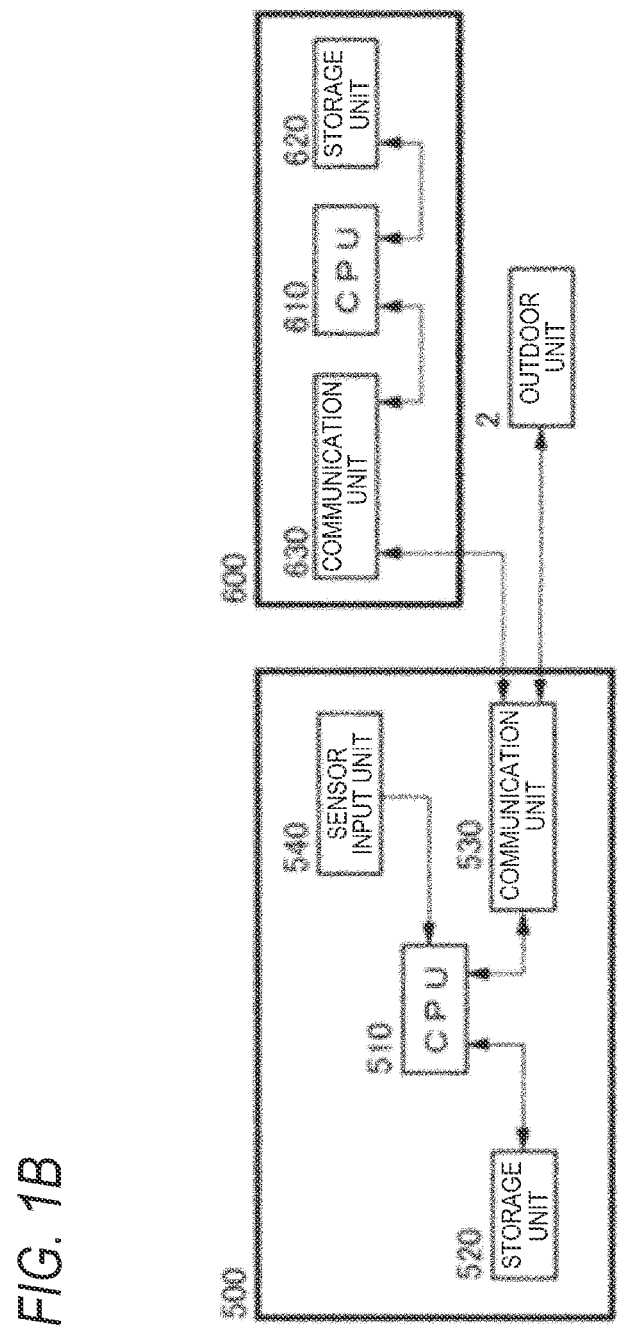
FIG. 1B is a functional block diagram of an indoor unit controller and a motor controller of the air conditioner according to the embodiment of the present invention.

Next, the ten indoor units 5 will be described with reference to FIGS. 1A, 1B, and 2. The indoor unit 5 according to the present embodiment is the duct-type indoor unit. The ten indoor units 5 all have the same configuration, and each includes an indoor heat exchanger 51, an indoor unit expansion valve 52, the liquid pipe coupling portion 53, the gas pipe coupling portion 54, an indoor unit fan 55, an indoor unit controller 500, and a motor controller 600 inside a housing 50 to be described later. These constituting units other than the indoor unit fan 55, the indoor unit controller 500, and the motor controller 600 are coupled to each other by respective refrigerant pipes described in detail below to constitute an indoor unit refrigerant circuit 50 that forms a part of the refrigerant circuit 10.

Figure 2:
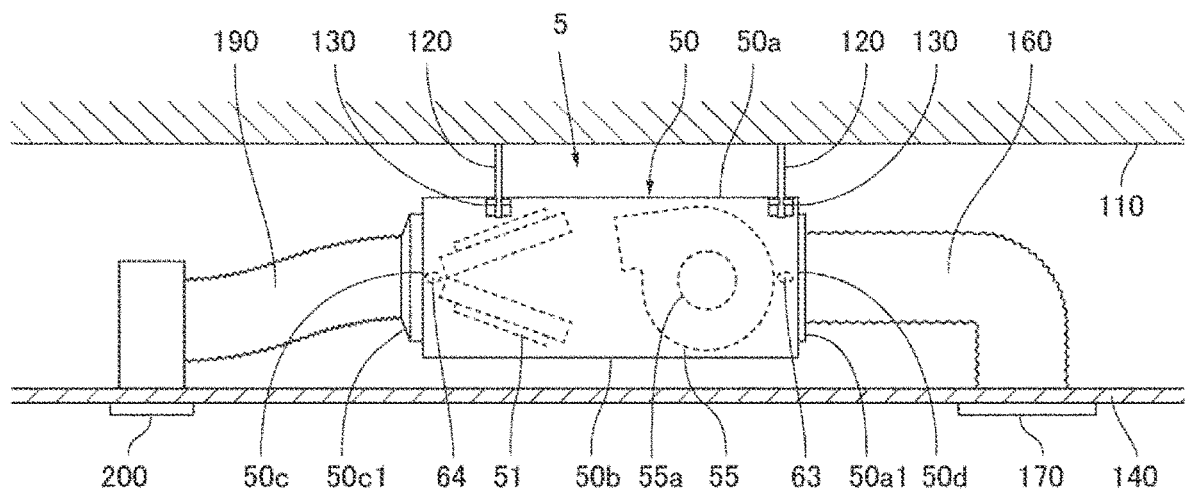
FIG. 2 is a diagram illustrating an indoor unit in the air conditioner according to the embodiment of the present invention.

As shown in FIG. 2, the indoor unit 5 is provided in a space between a building ceiling surface 110 and an indoor ceiling surface 140. Specifically, one end of a suspension bolt 120 is fixed to the building ceiling surface 110, and an attaching metal fitting 130 attached to a later-described top plate 11 of the indoor unit 5 is fixed to and suspended from the other end of the suspension bolt 120.

The indoor unit 5 includes a top plate 50a, a bottom plate 50b, a front plate 50c, a rear plate 50d, which are respectively formed of steel plates, and the housing 50 formed in a horizontally long rectangular parallelepiped shape by a right side plate and a left side plate (not shown). In the following description, in the housing 50, a direction in which the front plate 13 is disposed is referred to as a front direction, a direction in which the rear plate 14 is disposed is referred to as a rear direction, a direction in which the top plate 11 is disposed is referred to as an upper direction, a direction in which the bottom plate 12 is disposed is referred to as a lower direction, a direction in which a right side plate 15 is disposed is referred to as a right direction, a direction in which a left side plate 16 is disposed is referred to as a left direction, and each component constituting the indoor unit 5 will be also described with reference the same directions.

The rear plate 50d of the housing 50 is provided with an absorption port 50d1 for taking air into the housing 50. The front plate 50c of the housing 50 is provided with an air outlet 50c1 for blowing out air from the inside of the housing 50. The absorption port 50d1 is coupled to an absorption grill 170 provided on the indoor ceiling surface 140 via an absorption duct 160. The air outlet 50c1 is coupled to an air outlet grill 200 provided on the indoor ceiling surface 140 via an air outlet duct 190.

The indoor heat exchanger 51 performs the heat exchange between the refrigerant and indoor air taken into the inside of the indoor unit 5 from an absorption port (not shown) by rotation of the indoor unit fan 55 to be described later, has a bent shape as shown in FIG. 2, and is disposed near the air outlet 50c1 inside the housing 50 of the indoor unit 5. The shape of the indoor heat exchanger 51 shown in FIG. 2 is an example, and the shape of the indoor heat exchanger 51 is not limited thereto. As shown in FIG. 1A, an indoor unit liquid pipe 71 couples one of refrigerant entry/exit openings of the indoor heat exchanger 51 to the liquid pipe coupling portion 53, and an indoor unit gas pipe 72 couples the other one of the refrigerant entry/exit openings to the gas pipe coupling portion 54. The indoor heat exchanger 51 functions as the evaporator when the air conditioner 1 performs the cooling operation, and functions as the condenser when the air conditioner 1 performs the heating operation. The respective refrigerant pipes of the liquid pipe coupling portion 53 and the gas pipe coupling portion 54 are coupled by welding, a flare nut, or the like.

The indoor unit expansion valve 52 is provided in the indoor unit liquid pipe 71. The indoor unit expansion valve 52 is an electronic expansion valve. When the indoor heat exchanger 51 functions as the evaporator, that is, the indoor unit 5 performs the cooling operation, an opening degree of the indoor unit expansion valve 52 is adjusted, so that a refrigerant superheated degree at a refrigerant exit (gas pipe coupling portion 54 side) of the indoor heat exchanger 51 becomes a target refrigerant superheated degree. In addition, when the indoor heat exchanger 51 functions as the condenser, that is, the indoor unit 5 performs the heating operation, the opening degree of the indoor unit expansion valve 52 is adjusted, so that a refrigerant supercooling degree at a refrigerant exit (liquid pipe coupling portion 53 side) of the indoor heat exchanger 51 becomes a target refrigerant supercooling degree. Here, the target refrigerant superheated degree and the target refrigerant supercooling degree are respectively a refrigerant superheated degree and a refrigerant supercooling degree necessary for each of the indoor units 5 to exhibit a sufficient cooling capacity or a sufficient heating capacity.

The indoor unit fan 55 is a sirocco fan, includes a cylindrical impeller (not shown) that has a large number of blades inside a casing, is formed in a spiral shape, and is formed of a resin material, and includes a fan motor 55a coupled to a motor shaft coupled to a center of the impeller. As shown in FIG. 2, the indoor unit fan 55 is disposed between the indoor heat exchanger 51 inside the housing 50 of the indoor unit 5 and the absorption port 50d. When the impeller of the indoor unit fan 55 is rotated by the fan motor 55a, indoor air is taken into the housing 50 of the indoor unit 5 from the absorption port 50d1 via the absorption grill 170 and the absorption duct 160, and discharges the indoor air, which is subjected to heat-exchanging with the refrigerant in the indoor heat exchanger 51, into a room from the air outlet 50c1 via the air outlet duct 190 and the air outlet grill 200.

In addition to the configuration described above, various sensors are provided in the indoor unit 5. As shown in FIG. 1A, a liquid side temperature sensor 61 that detects a temperature of the refrigerant flowing into the indoor heat exchanger 51 or flowing out of the indoor heat exchanger 51 is provided between the indoor heat exchanger 51 and the indoor unit expansion valve 52 in the indoor unit liquid pipe 71. The indoor unit gas pipe 72 is provided with a gas side temperature sensor 62 that detects a temperature of the refrigerant flowing out of the indoor heat exchanger 51 or flowing into the indoor heat exchanger 51.

As shown in FIG. 2, an indoor temperature sensor 63 that detects a temperature of indoor air flowing into the housing 50 of the indoor unit 5 is provided near the absorption port 50d1 inside the housing 50 of the indoor unit 5. Further, a static pressure sensor 64 that detects a static pressure at the air outlet 50c1 is provided near the air outlet 50c1 inside the housing 50 of the indoor unit 5.

The indoor unit controller 500 is mounted on a control substrate accommodated in an electrical component box (not shown) provided in the indoor unit 5. As shown in FIG. 1B, the indoor unit controller 500 includes a CPU 510, a storage unit 520, a communication unit 530, and a sensor input unit 540.

The storage unit 520 is formed by, for example, a flash memory, and stores a control program of the indoor unit 5, detection values corresponding to detection signals from various sensors, a control state of the indoor fan 55, and the like. The communication unit 530 is an interface for communicating with the outdoor unit 2 and a remote controller (not shown) operated by a user. The sensor input remit 540 acquires detection results acquired from various sensors of the indoor unit 5, and outputs the detection results to the CPU 510.

The CPU 510 acquires the detection results acquired from various sensors of the indoor unit 5 described above via the sensor input unit 540. In addition, the CPU 510 acquires, via the communication unit 530, an operation information signal that includes an operation mode (cooling operation/dehumidification operation/reheat dehumidification operation/heating operation), an air volume, and the like, and is transmitted from the remote controller (not shown) operated by the user. The CPU 510 adjusts the opening degree of the indoor unit expansion valve 52 based on the acquired detection results and the operation information signal.

The motor controller 600 is mounted on a control substrate attached to the casing of the indoor unit fan 55. As shown in FIG. 1B, the motor controller 600 includes a CPU 610, a storage unit 620, and a communication unit 630.

The storage unit 620 is formed by, for example, a flash memory, and stores data in which the air volume is associated with a rotation speed of the fan motor of the indoor unit fan 55 described later with reference to FIG. 3, data in which the static pressure is associated with a current value of the fan motor of the indoor unit fan 55 described later with reference to FIG. 4, static pressure values detected by the static pressure sensor 64 and acquired via the indoor unit controller 500, and the like. The communication unit 630 is an interface for communicating with the indoor unit 5.

The CPU 610 performs the drive control on the indoor unit fan 55 based on the various kinds of data and the static pressure values stored in the storage unit 620 described above. Further, the CPU 610 performs the drive control on the indoor unit fan 55, so that a rotation speed of the indoor unit fan 55 becomes the rotation speed of the fan motor of the indoor unit fan 55 received from the indoor unit controller 500.

The indoor unit controller 500 and the motor controller 600 described above correspond to a controller of the present invention. The drive control performed on the indoor unit fan 55 by the controller will be described in detail later.

<Operations of Refrigerant Circuit>

Next, flows of the refrigerant in the refrigerant circuit 10 and operations of each unit during an air-conditioning operation of the air conditioner 1 according to the present embodiment will be described with reference to FIG. 1A. In the following description, first, the case where the air conditioner 1 performs the heating operation will be described, and next, the case where the air conditioner 1 performs the cooling operation will be described. Solid arrows in FIG. 1A indicate a flow of the refrigerant during the heating operation. Broken arrows in FIG. 1A indicate a flow of the refrigerant during the cooling operation.

<Heating Operation>

As shown in FIG. 1A, when the air conditioner 1 performs the heating operation, the four-way valve 22 is switched to a state indicated by solid lines, that is, the port a and the port d of the four-way valve 22 communicate with each other, and the port b and the port c of the four-way valve 22 communicate with each other. Thus, the refrigerant circuit 10 serves as a heating cycle in which each indoor heat exchanger 51 functions as the condenser and the outdoor heat exchanger 23 functions as the evaporator.

When the compressor 21 is driven in the state where the refrigerant circuit 10 serves as the heating cycle, the refrigerant discharged from the compressor 21 flows through the discharge pipe 41 into the four-way valve 22, flows through the outdoor unit gas pipe 45 from the four-way valve 22, and flows into the gas pipe 9 via the closing valve 26.

The refrigerant flowing through the gas pipe 9 is diverted to each of the indoor units 5 via the respective gas pipe coupling portions 54. The refrigerant flowing into each indoor unit 5 flows through each indoor unit gas pipe 72, and flows into each indoor heat exchanger 51. The refrigerant flowing into each indoor heat exchanger 51 is condensed by being subjected to the heat exchange with the indoor air taken into each indoor unit 5 by the rotation of each indoor unit fan 55.

In this manner, each indoor heat exchanger 51 functions as the condenser, and the indoor air heated by being subjected to the heat exchange with the refrigerant in each indoor heat exchanger 51 is blown into the room from the air outlet 50c1 via the air outlet duct 190 and the air outlet grill 200, thereby heating the room in which each indoor unit 5 is provided.

The refrigerant flowing from each indoor heat exchanger 51 into each indoor unit liquid pipe 71 is decompressed when passing through each indoor unit expansion valve 52 of which the opening degree is adjusted so that the refrigerant supercooling degree on the refrigerant exit side of each indoor heat exchanger 51 becomes the target refrigerant supercooling degree. Here, the target refrigerant supercooling degree is determined based on the heating capacity required in each of the indoor units 5. The heating capacity is determined based on a temperature difference between a set setting temperature and a detected indoor temperature in each indoor unit 5.

The refrigerant decompressed by each indoor unit expansion valve 52 flows out from each indoor unit liquid pipe 71 to the liquid pipe 8 via each liquid pipe coupling portion 53. The refrigerants merged in the liquid pipe 8 and flowing into the outdoor unit 2 via the closing valve 25 flows through the outdoor unit liquid pipe 44, and is further decompressed when passing through the outdoor unit expansion valve 24 of which the opening degree is adjusted so that the refrigerant superheated degree on the refrigerant exit side of the outdoor heat exchanger 23 becomes the target refrigerant superheated degree. Here, the target refrigerant superheated degree is obtained by performing a test or the like in advance and stored in a storage unit 220 of an outdoor unit controller 200, and is a value at which it can be confirmed that no liquid back occurs when the refrigerant superheated degree on the refrigerant exit side of the outdoor heat exchanger 23 functioning as the evaporator during the heating operation becomes the target refrigerant superheated degree.

The refrigerant decompressed by the outdoor unit expansion valve 24 flows through the outdoor unit liquid pipe 44 and flows into the outdoor heat exchanger 23, is subjected to the heat exchange with ambient air taken into the outdoor unit 5 by the rotation of the outdoor unit fan 28 at a maximum rotation speed, and is evaporated. The refrigerant flowing from the outdoor heat exchanger 23 into the refrigerant pipe 43 flows through the four-way valve 22, the refrigerant pipe 46, the accumulator 27, and the absorption pipe 42 in this order, is absorbed into the compressor 21, and is compressed again.

<Cooling Operation>

As shown in FIG. 1A, when the air conditioner 1 performs the cooling operation, the four-way valve 22 is switched to a state indicated by broken lines, that is, the port a and the port b of the four-way valve 22 communicate with each other, and the port c and the port d of the four-way valve 22 communicate with each other. Thus, the refrigerant circuit 10 serves as a cooling cycle in which each indoor heat exchanger 51 functions as the evaporator and the outdoor heat exchanger 23 functions as the condenser.

When the compressor 21 is driven in the state where the refrigerant circuit 10 serves as the cooling cycle, the refrigerant discharged from the compressor 21 flows through the discharge pipe 41 into the four-way valve 22, and flows from the four-way valve 22 into the outdoor heat exchanger 23 via the refrigerant pipe 43. The refrigerant flowing into the outdoor heat exchanger 23 is condensed by being subjected to the heat exchange with the ambient air taken into the outdoor unit 2 by the rotation of the outdoor unit fan 28. The refrigerant flowing out from the outdoor heat exchanger 23 to the outdoor unit liquid pipe 44 passes through the outdoor unit expansion valve 24 of which the opening degree is fully opened, and flows to the liquid pipe 8 via the closing valve 25.

The refrigerant flowing through the liquid pipe 8 flows into each of the indoor units 5 via the respective liquid pipe coupling portion 53. The refrigerant flowing into each indoor unit 5 flows through each indoor unit liquid pipe 71, and is decompressed when passing through each indoor unit expansion valve 52 of which the opening degree is adjusted so that the refrigerant superheated degree at the refrigerant exit of each indoor heat exchanger 51 becomes the target refrigerant superheated degree. Here, the target refrigerant superheated degree is determined based on the cooling capacity required in each of the indoor units 5. The cooling capacity is determined based on a temperature difference between a set setting temperature and a detected indoor temperature in each indoor unit 5.

The refrigerant flowing from each indoor unit liquid pipe 71 into each indoor heat exchanger 51 is evaporated by being subjected to the heat exchange with the indoor air taken into each indoor unit 5 by the rotation of each indoor unit fan 55. In this manner, each indoor heat exchanger 51 functions as the evaporator, and the indoor air cooled by being subjected to the heat exchange with the refrigerant in each indoor heat exchanger 51 is blown into the room from the air outlet 50c1 via the air outlet duct 190 and the air outlet grill 200, thereby cooling the room in which each indoor unit 5 is provided.

The refrigerant flowing out from each indoor heat exchanger 51 to each indoor unit gas pipe 72 flows out to the gas pipe 9 via each gas pipe coupling portion 54. The refrigerants merged in the gas pipe 9 and flowing into the outdoor unit 2 via the closing valve 26 flows through the outdoor unit gas pipe 45, the four-way valve 22, the refrigerant pipe 46, the accumulator 27, and the absorption pipe 42 in this order, is absorbed into the compressor 21, and is compressed again.

<Drive Control of Indoor Unit Fan>

When the air conditioner 1 performs the above-described heating operation or cooling operation, an air volume blown out from each indoor unit 5 is an air volume required by the user. Specifically, the user operates the remote controller (not shown) to transmit a required air volume (weak, medium, strong, or the like) to the indoor unit 5, and the indoor unit controller 500 of the indoor unit 5 that receives the air volume transmits the received air volume to the motor controller 600. Then, the motor controller 600 that receives the air volume first determines a rotation speed of the fan motor 55a by using a static pressure value at a time point at which a rotation speed of the fan motor is determined and the received air volume, and then determines a motor current that is a current to be applied to the fan motor 55a by using the determined rotation speed and the static pressure value at the time point at which the rotation speed of the fan motor is determined.

Hereinafter, the drive control performed on the indoor unit fan 55 will be described in detail later. First, a method of determining the rotation speed of the fan motor 55a that implements the air volume instructed by the user will be described with reference to FIG. 3, and then a method of determining the motor current to be applied to the fan motor 55a will be described with reference to FIG. 4. Finally, a flow of a process executed by the indoor unit controller 500 and a flow of a process executed by the motor controller 600 when the drive control is performed on the indoor unit fan 55 will be described with reference to FIG. 5.

In the following description, the air volume blown out from the indoor unit 5 is referred to as an air volume Av (unit: CFM), the rotation speed of the fan motor 55a is referred to as a fan rotation speed km (unit: rpm), the static pressure value is referred to as a static pressure Pt (unit: Pa), and the motor current to be applied to the fan motor 55a is referred to as a motor current Im (unit: mA).

<Determination of Fan Rotation Speed>

When the motor controller 600 performs the drive control on the indoor unit fan 55, first, the fan rotation speed Rm necessary for implementing the air volume Av required by the user is determined. FIG. 3 shows a relationship among the air volume Av, the fan rotation speed Rm, and the static pressure Pt, and the relationship is stored in the storage unit 620 of the motor controller 600 after a test or the like is performed in advance. In FIG. 3, a horizontal axis indicates the air volume Av, and as an example, the air volume Av is 300 CFM (corresponding to air volume: weak), 600 CFM (corresponding to air volume: medium), and 900 CFM (corresponding to air volume: strong). Further, a vertical axis indicates the fan rotation speed Rm, and as an example, when the static pressure Pt is 25 Pa, the fan rotation speed Rm required to set the air volume Av to 300 CFM is 150 rpm, the fan rotation speed Rm required to set the air volume Av to 600 CFM is 300 rpm, and the fan rotation speed Rm required to set the air volume Av to 900 CFM is 450 rpm.

The static pressure Pt is set to 0 Pa, 10 Pa, 20 Pa, 25 Pa, 30 Pa, 40 Pa, and 50 Pa, and each static pressure Pt is a straight line in which the fan rotation speed Rm increases with an increase in the air volume Av starting from a point where both the air volume AV and the fan rotation speed Rm are 0. That is, the fan rotation speed Rm required for implementing the same air volume Av differs depending on the static pressure Pt, and for example, in case in which the air volume Av is desired to be 600 CFM, when the static pressure Pt is 25 Pa, the fan rotation speed Rm needs to be 300 rpm, when the static pressure Pt is smaller than 25 Pa, a rotation speed lower than 300 rpm is required, and when the static pressure Pt is larger than 25 Pa, a rotation speed higher than 300 rpm is required.

The CPU 610 of the motor controller 600 acquires the air volume Av instructed by the user and the static pressure Pt detected by the static pressure sensor 64 from the indoor unit controller 500 via the communication unit 630, and rounds off the acquired static pressure Pt, for example, to any value of 0 Pa to 50 Pa as described above. Then, the fan rotation speed Rm that implements the air volume Av is determined by using the relationship among the air volume Av, the fan rotation speed Rm, and the static pressure Pt shown in FIG. 3. The CPU 610 stores the air volume Av and the static pressure Pt acquired from the indoor unit controller 500 and the determined fan rotation speed Rm in the storage unit 620.

<Determination of Motor Current>

Next, the CPU 610 of the motor controller 600 determines the motor current Im. FIG. 4 shows a relationship among the motor current Im, the fan rotation speed Rm, and the static pressure Pt, and the relationship is stored in the storage unit 620 of the motor controller 600 after a test or the like is performed in advance. In FIG. 4, a horizontal axis indicates the motor current Im, and a vertical axis indicates the static pressure Pt. FIG. 4 shows a relationship between the motor current Im and the static pressure Pt when the fan rotation speed Rm is 300 rpm as an example, in which the motor current Im when the static pressure Pt is 0 Pa is I1, the motor current Im when the static pressure Pt is 25 Pa is I2, and the motor current Im when the static pressure Pt is 50 Pa is I3. That is, the motor current Im required for implementing the same fan rotation speed Rm varies depending on the static pressure Pt. The relationship between the motor current Im and the static pressure Pt shown in FIG. 4 is stored in the storage unit 620 for each of a plurality of fan rotation speeds Rm, and for example, a range from a minimum rotation speed (for example, 200 rpm) to a maximum rotation speed (for example, 1300 rpm) of the fan rotation speed Rm is divided at 10 rpm each, and the relationship between the motor current Im and the static pressure Pt is stored for each fan rotation speed Rm.

Figure 3:
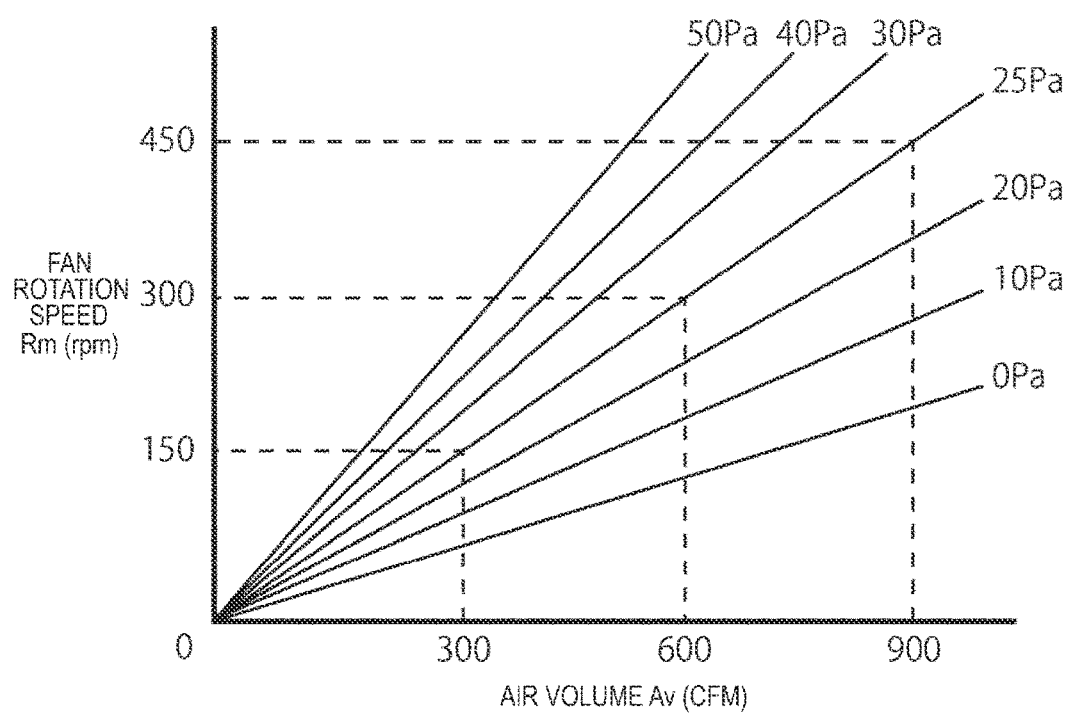
FIG. 3 is a diagram showing a relationship between an air volume and a motor rotation speed of a fan in the air conditioner according to the embodiment of the present invention.
Figure 4:
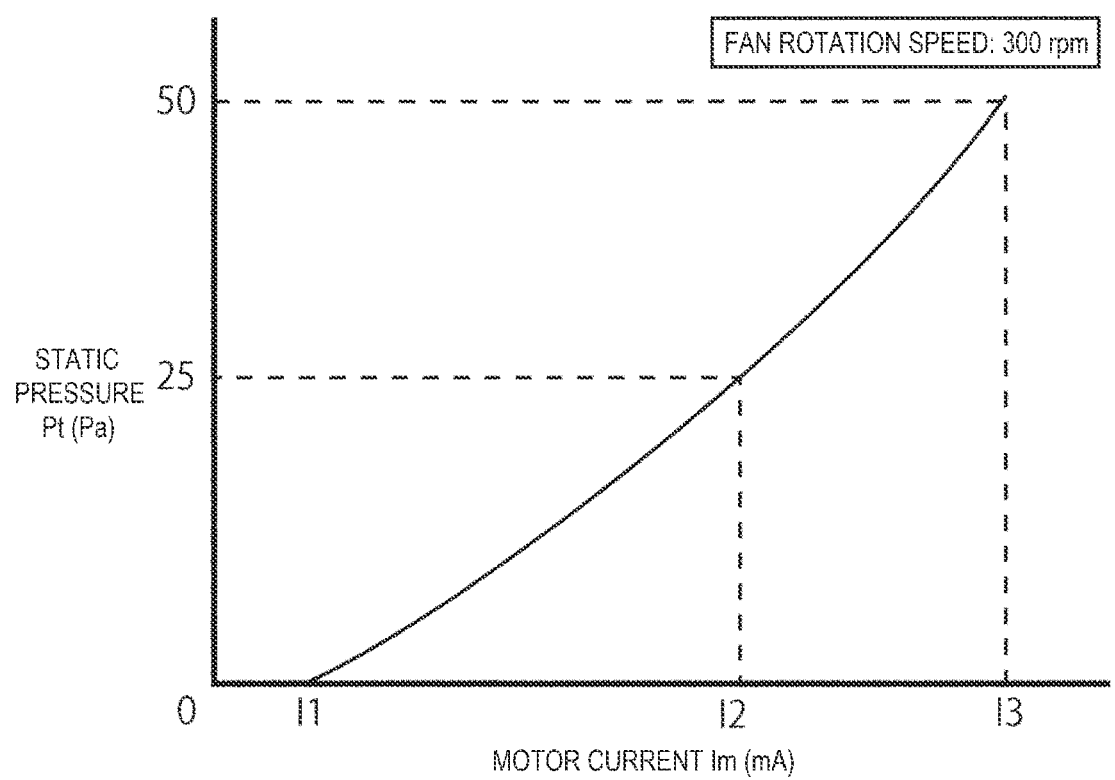
FIG. 4 is a diagram showing a relationship between a static pressure and a current of a motor of the fan in the air conditioner according to the embodiment of the present invention.

The CPU 610 of the motor controller 600 determines the fan rotation speed Ran corresponding to the desired to be implemented air volume Av at the static pressure value at the time point at which the rotation speed of the fan motor is determined by using FIG. 3, and determines the motor current Im corresponding to the determined fan rotation speed Rm at the static pressure value at the time point at which the rotation speed of the fan motor is determined by using FIG. 4. The CPU 610 stores the determined motor current Im in the storage unit 620.

<Processes Related to Drive Control of Indoor Unit Fan>

Figure 5A:
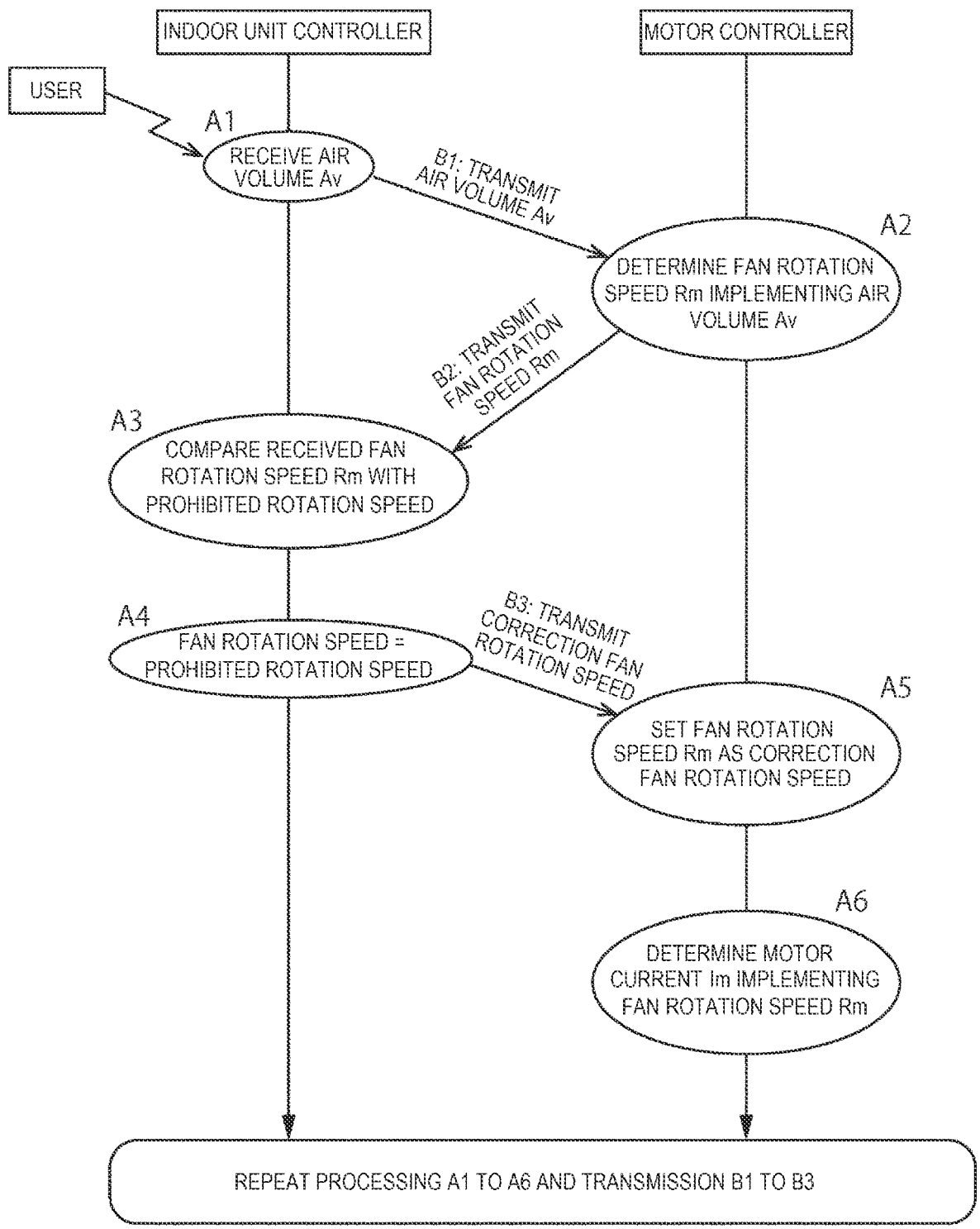
FIG. 5A is a diagram illustrating a flow of control of an indoor fan when a fan rotation speed is a prohibited rotation speed.
Figure 5B:
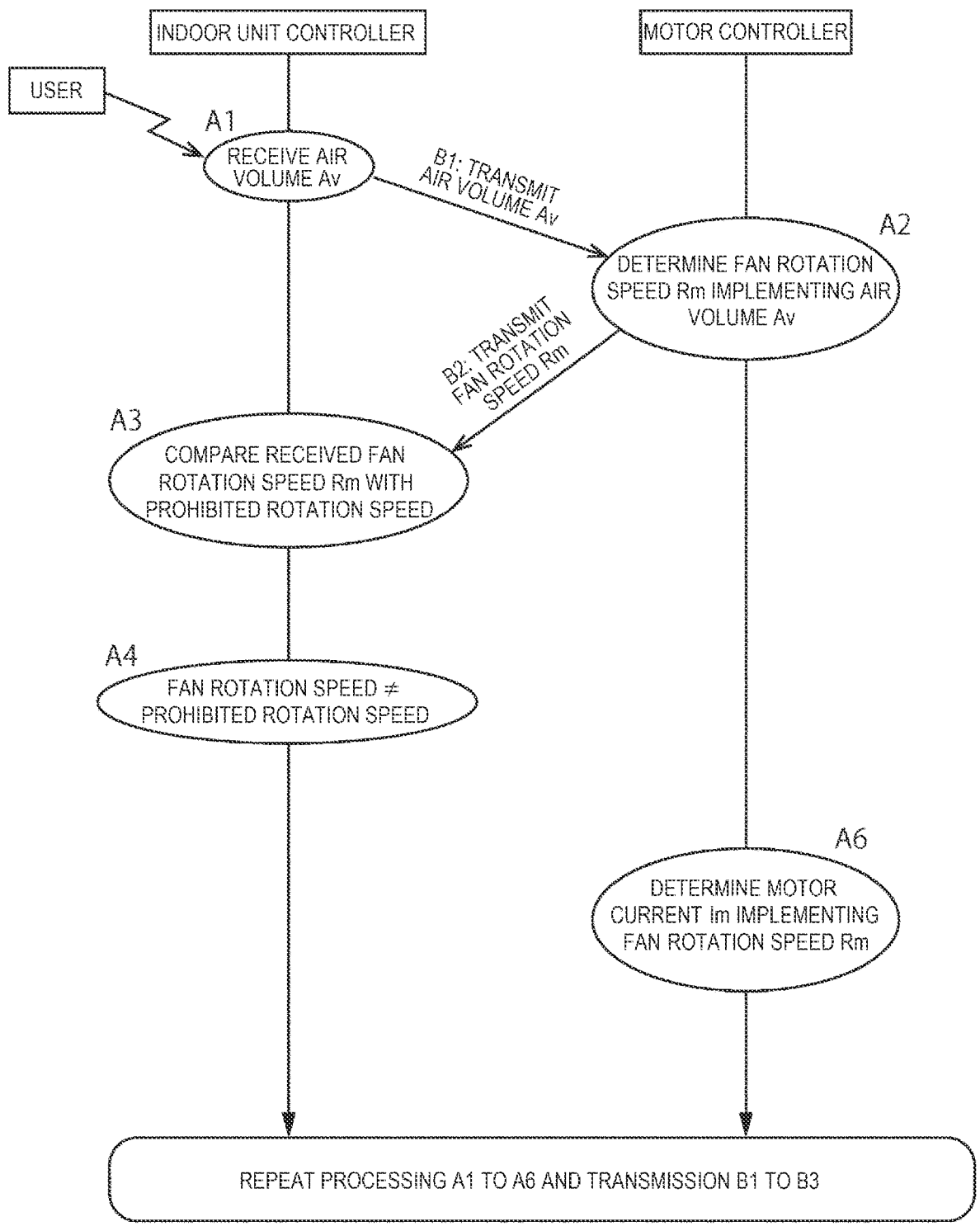
FIG. 5B is a diagram illustrating a flow of control of the indoor fan when the fan rotation speed is not the prohibited rotation speed.

Next, processes related to the drive control performed on the indoor unit fan 55 and each including the determination of the fan rotation speed Rm and the determination of the motor current Im described above will be described with reference to FIGS. 5A, 5B, 6A and 6B. First, with reference to FIGS. 5A and 5B, a flow of a process when each indoor unit 5 performs the drive control on the indoor unit fan 55, specifically, when the indoor unit controller 500 and the motor controller 600 perform the drive control on the indoor unit fan 55 in conjunction with each other will be described. Next, with reference to FIGS. 6A and 6B, processes related to the drive control performed on the indoor unit fan 55 and respectively executed by the indoor unit controller 500 and the motor controller 600 will be described. In FIGS. 5A and 5B, processes executed by the respective controllers are denoted by reference numerals A1 to A6, and transmission between the respective controllers are denoted by reference numerals B1 to B3.

<Flow of Overall Process when Driving Control is Performed on Indoor Unit Fan>

When the indoor unit controller 500 and the motor controller 600 perform the drive control on the indoor unit fan 55 in conjunction with each other, the flow of process differs between a case where the determined fan rotation speed Rm is a prohibited rotation speed described later and a case where the determined fan rotation speed Rm is not the prohibited rotation speed. In the following description, first, the flow of process when the fan rotation speed Rm is the prohibited rotation speed will be described with reference to FIG. 5A, and next, the flow of process when the fan rotation speed Rm is not the prohibited rotation speed will be described with reference to FIG. 5B.

<A Case Where Fan Rotation Speed Rm is Prohibition Rotation Speed>

As shown in FIG. 5A, when the indoor unit controller 500 receives the air volume Av instructed by the user (A1), the indoor unit controller 500 transmits the instructed air volume Av to the motor controller 600 (B1). The motor controller 600 that receives the air volume Av determines the fan rotation speed Rm that implements the received air volume Av (A2), and transmits the determined fan rotation speed Rm to the indoor unit controller 500 (B2). Note that a specific method of determining the fan rotation speed Rm will be described in detail when a process to be executed by the motor controller 600 thereafter is described.

The indoor unit controller 500 that receives the fan rotation speed Rm compares the received fan rotation speed Rm with the prohibited rotation speed, which is to be described later, stored in the storage unit 520 (A3). Then, if the received fan rotation speed Rm is the same as the prohibited rotation speed as a result of the comparison, the indoor unit controller 500 transmits a correction fan rotation speed to the motor controller 600 (B3), and if the fan rotation speed Rm is different from the prohibited rotation speed (OK), the indoor unit controller 500 does not transmit the correction fan rotation speed (A4). In this case, the motor controller 600 uses the fan rotation speed Rm determined in the processing A2. Note that a specific method of determining the correction fan rotation speed will be described in detail when a process to be executed by the indoor unit controller 500 thereafter is described.

The motor controller 600 that receives the correction fan rotation speed sets the fan rotation speed Rm as the correction fan rotation speed (A5). When the motor controller 600 does not receive the correction fan rotation speed from the indoor unit controller 500, the motor controller 600 uses the fan rotation speed Rm determined in step A2 in the next step A6. Then, the motor controller 600 determines the motor current Im that implements the determined fan rotation speed Rm (A6), and applies the determined motor current Im to the fan motor 55a. Note that a specific method of determining the motor current Im will be described in detail when a process to be executed by the motor controller 600 thereafter is described.

The processing of A1, A3, A4 performed by the indoor unit controller 500, the processing of A2, A5, A6 performed by the motor controller 600, and the transmission of B1, B2, B3 performed between the indoor unit controller 500 and the motor controller 600 described above are repeatedly performed while the indoor unit 5 operates.

<A Case Where Fan Rotation Speed Rm is not Prohibition Rotation Speed>

In the flow of the process shown in FIG. 5B, the processing of A1, A3 performed by the indoor unit controller 500, the processing of A2 performed by the motor controller 600, and the transmission of B1, B2 performed between the indoor unit controller 500 and the motor controller 600 are the same as those in FIG. 5A, and thus the description thereof will be omitted. Here, the processing of A4 and thereafter performed by the indoor unit controller 500 will be described.

If the received fan rotation speed Rm is not the same as the prohibited rotation speed as a result of the comparison, the indoor unit controller 500 does not perform the transmission of B3 in FIG. 5A, that is, does not transmit the correction fan rotation speed to the motor controller 600, and thereafter, the indoor unit controller 500 repeatedly performs the processing of A1, A3, A4 and the transmission of B1, B3 while the indoor unit 5 operates.

Accordingly, since the motor controller 600 does not receive the correction fan rotation speed from the indoor unit controller 500, the processing of A5 in FIG. 5A is not performed, the motor controller 600 determines the motor current Im that implements the fan rotation speed Rm determined in step A2 (A6), and applies the determined motor current Im to the fan motor 55a. Thereafter, the motor controller 600 repeatedly executes the processing of A2, A6 and the transmission of B2 while the indoor unit 5 operates.

<Processes Executed by Respective Controllers>

Figure 6A:
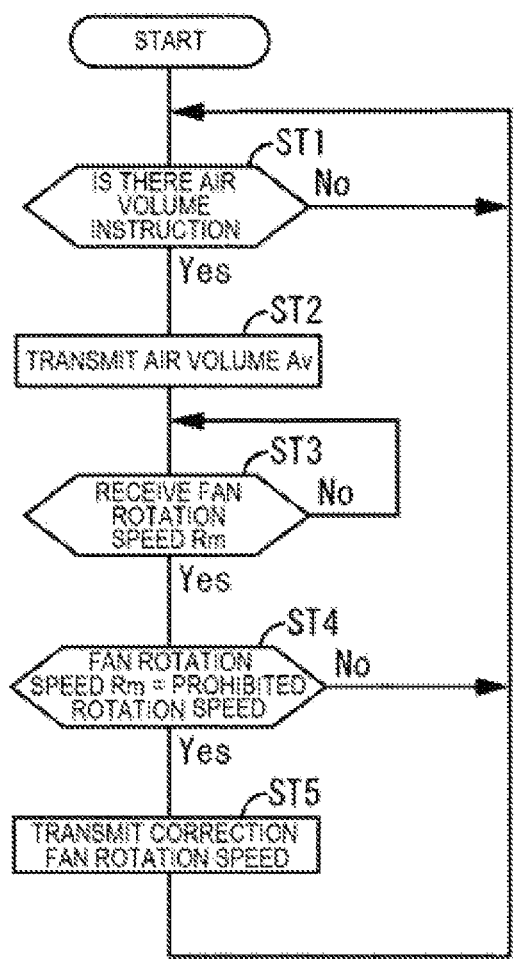
Figure 6B:
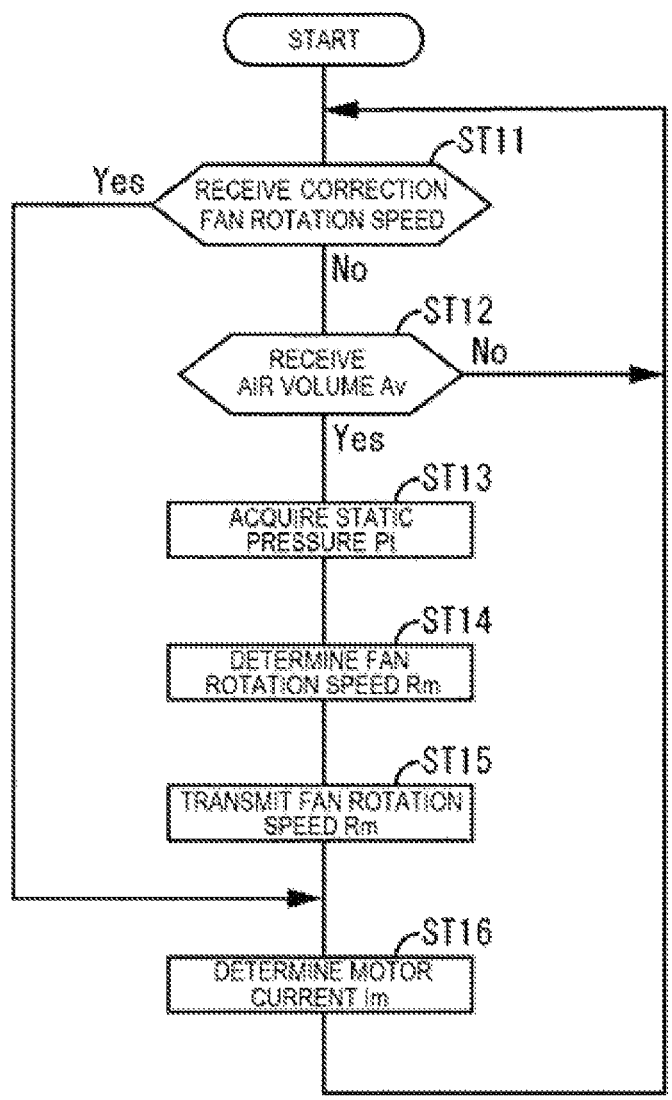

Next, processes respectively executed by the indoor unit controller 500 and the motor controller 600, related to the drive control performed on the indoor unit fan 55, and each also including the determination of the fan rotation speed Rm and the determination of the motor current Im described above will be individually described with reference to FIGS. 6A and 6B. FIG. 6A is a flowchart showing a process performed by the CPU 510 of the indoor unit controller 500 when the drive control is performed on the indoor unit fan 55 in each of the indoor units 5. FIG. 6B is a flowchart showing a process performed by the CPU 610 of the motor controller 600 when the drive control is performed on the indoor unit fan 55 in each of the indoor units 5. Here, in each flowchart shown in FIGS. 6A and 6B, ST represents a step of the process, and a number following ST represents an order of the step. Note that FIGS. 6A and 6B shows only the processing related to the present invention, and description of other general control related to the air conditioner 1 is omitted.

<Flow of Process Executed by Indoor Unit Controller>

First, a process performed by the CPU 510 of the indoor unit controller 500 when the drive control is performed on the indoor unit fan 55 will be described with reference to FIG. 6A. When the air conditioner 1 performs the air conditioning operation, the CPU 510 determines whether there is an air volume instruction from the user (ST1). Here, the air volume instruction from the user includes a case where the user instructs the air volume at the time of starting an operation of the air conditioner 1 and a case where the user instructs to change the air volume during the air-conditioning operation. As described above, the user operates the remote controller (not shown) to instruct the indoor unit 5 about the required air volume.

When there is no air volume instruction from the user (ST1-No), the CPU 510 returns the process to ST1. When there is an air volume instruction from the user (ST1-Yes/processing of A1 in FIG. 5), the CPU 510 transmits the air volume Av instructed by the user to the motor controller 600 (ST2/the transmission of B1 in FIG. 5). Specifically, the CPU 510 transmits the air volume Av to the motor controller 600 via the communication unit 530.

Next, the CPU 510 determines whether the fan rotation speed Rm determined by the motor controller 600 is received from the motor controller 600 (ST3). When the fan rotation speed Rm is not received from the motor controller 600 (ST3-No), the CPU 510 returns the process to ST3 and waits for reception of the fan rotation speed Rm. When the fan rotation speed Rm is received from the motor controller 600 (ST3-Yes), the CPU 510 compares the received fan rotation speed Rm with the prohibited rotation speed, and determines whether the received fan rotation speed Rm is the prohibited rotation speed (ST4/processing of A3 in FIG. 5). Here, the prohibited rotation speed is a rotation speed obtained by performing a test or the like in advance and stored in the storage unit 520 of the indoor unit controller 500, and is, for example, a rotation speed at which it is known that when the indoor unit fan 55 is driven at the prohibited rotation speed, the housing 50 of the indoor unit 5 resonates and abnormal noise is generated. The determination as to whether the received fan rotation speed Rm is the prohibited rotation speed described above corresponds to the determination as to whether a predetermined condition of the present invention is satisfied. Therefore, when the fan rotation speed Rm is not the prohibited rotation speed, it is determined that the predetermined condition is satisfied, and when the fan rotation speed Rm is the prohibited rotation speed, it is determined that the predetermined condition is not satisfied.

When the received fan rotation speed Rm is not the prohibited rotation speed (ST4-No/when "OK" is determined in the processing of A4 in FIG. 5), the CPU 510 returns the process to ST1. When the received fan rotation number Rm is the prohibited rotation speed (ST4-Yes/when "NG" is determined in the processing of A4 in FIG. 5), the CPU 510 transmits the correction fan rotation speed obtained by changing the fan rotation number Rm received in ST3 to the motor controller 600 (ST5/the transmission of B3 in FIG. 5), and returns the process to ST1. The correction fan rotation speed described above corresponds to a second fan rotation speed of the present invention.

Here, the correction fan rotation speed is a rotation speed slightly shifted from the prohibited rotation speed by changing the received fan rotation speed Rm when the received fan rotation speed Rm is the prohibited rotation speed as described above, and is a rotation speed at which the resonance of the housing 50 of the indoor unit 5 does not occur even when the indoor unit fan 55 is driven at the correction fan rotation speed. For example, when the prohibited rotation speed is 650 to 670 rpm and the fan rotation speed Rm received from the motor controller is a rotation speed in the range of the prohibited rotation speed, the correction fan rotation speed is set to 640 rpm or 680 rpm. Here, whether to set the correction fan rotation speed to 640 rpm or 680 rpm may be determined based on whether the air volume instruction of the user in ST1 is an instruction to make the air volume larger than an air volume up to now. The correction fan rotation speed may be set to 680 rpm when the air volume instruction of the user is an instruction to make the air volume larger than the air volume up to now, and the correction fan rotation speed may be set to 640 rpm when the air volume instruction of the user is an instruction to make the air volume smaller than the air volume up to now. Note that 640 rpm and 680 rpm, which are the correction fan rotation speeds described above, are rotation speeds close to a first fan rotation speed of the present invention.

<Flow of Process Executed by Motor Controller>

Next, a process performed by the CPU 610 of the motor controller 600 when the drive control is performed on the indoor unit fan 55 will be described with reference to FIG. 6B. When the air conditioner 1 performs the air conditioning operation, the CPU 610 determines whether the correction fan rotation speed is received from the indoor unit controller 500 (ST11). When the correction fan rotation speed is transmitted from the indoor unit controller 500, the CPU 610 receives the correction fan rotation speed via the communication unit 630.

When the correction fan rotation speed is received (ST11-Yes/the processing of A5 in FIG. 5), the CPU 610 proceeds the process to ST16. When the correction fan rotation speed is not received (ST11-No), the CPU 610 determines whether the air volume Av is received from the indoor unit controller 500 (ST12). When the air volume Av is transmitted from the indoor unit controller 500, the CPU 610 receives the air volume Av via the communication unit 630.

When the air volume Av is not received (ST12-No), the CPU 610 returns the process to ST11. When the air volume Av is received (ST12-Yes/the processing of A2 in FIG. 5), the CPU 610 acquires the static pressure Pt (ST13). Specifically, the static pressure Pt is detected by the static pressure sensor 64, acquired by the indoor unit controller 500 via the sensor input unit 540, and transmitted to the motor controller 600 via the communication unit 530. Then, the static pressure Pt transmitted from the indoor unit controller 500 is acquired by the CPU 610 via the communication unit 630.

Next, the CPU 610 determines the fan rotation speed Rm (ST14). Specifically, the CPU 610 determines the fan rotation speed Rm by using the air volume Av acquired in ST12 and the static pressure Pt acquired in ST13, and referring to the relationship (shown in FIG. 3) among the air volume Av, the fan rotation speed Rm, and the static pressure Pt stored in the storage unit 620. The fan rotation speed Rm determined in the processing of ST14 corresponds to the first fan rotation speed of the present invention.

Next, the CPU 610 transmits the fan rotation speed Rm determined in ST14 to the indoor unit controller 500 via the communication unit 630 (ST15/the transmission of B2 in FIG. 5). Then, the CPU 610 determines the motor current Im (ST16/the processing of A6 in FIG. 5), and returns the process to ST11. Specifically, the CPU 610 determines the correction fan rotation speed received in ST11 or the motor current Im that implements the fan rotation speed Rm determined in ST14 by using the static pressure Pt acquired in ST13 and the fan rotation speed Rm determined in ST14, and referring to the relationship (shown in FIG. 4) among the motor current Im, the fan rotation speed Rm, and the static pressure Pt stored in the storage unit 620.

The CPU 610 performs the drive control on the indoor unit fan 55 by supplying the motor current Im determined in ST16 to the fan motor 55a.

As described above, in the air conditioner 1 of the present embodiment, the motor controller 600 determines the fan rotation speed Rm of the fan motor 55a of the indoor unit fan 55 that implements the air volume Av required by the user based on the static pressure Pt, and transmits the determined fan rotation speed Rm to the indoor unit controller 500. When the fan rotation speed Rm received from the motor controller 600 is the prohibited rotation speed, the indoor unit controller 500 transmits a correction fan rotation speed different from the prohibited rotation speed to the motor controller 600. Then, the motor controller 600 drives the fan motor 55a at either the received correction fan rotation speed or the fan rotation speed Rm determined based on the static pressure Pt.

As described above, in the air conditioner 1 of the present embodiment, when the motor controller 600 performs the drive control on the fan motor 55a of the indoor unit fan 55, it is possible to select to drive the fan motor 55a at the fan rotation speed Rm based on the air volume Av required by the user or to drive the fan motor 55a at the correction fan rotation speed instructed by the indoor unit controller 500. Accordingly, it is possible to avoid driving of the fan motor 55a at the fan rotation speed Rm at which the housing 50 of the indoor unit 5 resonates, while implementing the air volume Av required by the user.

Although the present invention is described in detail with reference to the specific embodiment, it is apparent to those skilled in the art that various changes and modifications can be made without departing from the spirit and scope of the present invention.

REFERENCE SIGNS LIST 1 air conditioner
2 outdoor unit
5 indoor unit
13a air outlet
14a absorption port
55 indoor unit fan
55a fan motor
64 static pressure sensor
500 indoor unit controller
510 CPU
530 communication unit
600 motor controller
610 CPU
620 storage unit
630 communication unit
Av air volume
Im motor current
Pt static pressure
Rm fan rotation speed

The invention claimed is:
1. An air conditioner comprising:
an indoor unit including an indoor heat exchanger, an indoor unit fan including a fan motor, and a static pressure sensor configured to detect a static pressure of air blown out from the indoor unit fan; and
a controller configured to control the fan motor,
wherein the controller uses a static pressure value detected by the static pressure sensor and an air volume of conditioned air blown out from the indoor unit required by a user to determine a first fan rotation speed, which is a rotation speed of the indoor unit fan that implements the air volume, when the determined first fan rotation speed is not a prohibited rotation speed at which resonance occurs in the indoor unit, the controller controls the fan motor so that the indoor unit fan rotates at the first fan rotation speed, when the determined first fan rotation speed is the prohibited rotation speed, the controller controls the fan motor so that the indoor unit fan rotates at a second fan rotation speed different from the first fan rotation speed, the controller sets the second fan rotation speed to a rotation speed close to the first fan rotation speed and higher than the prohibited rotation speed when the first fan rotation speed is the prohibited rotation speed and the air volume used to determine the first fan rotation speed is larger than an air volume before the first fan rotation speed, and the controller sets the second fan rotation speed to a rotation speed close to the first fan rotation speed and lower than the prohibited rotation speed when the air volume used to determine the first fan rotation speed is smaller than the air volume before the first fan rotation speed.

2. The air conditioner according to claim 1, wherein the controller sets the second fan rotation speed to a rotation speed close to the first fan rotation speed and higher than the prohibited rotation speed when the first fan rotation speed is the prohibited rotation speed and the air volume used to determine the first fan rotation speed is larger than an air volume before the first fan rotation speed, and the controller sets the second fan rotation speed to a rotation speed close to the first fan rotation speed and lower than the prohibited rotation speed when the air volume used to determine the first fan rotation speed is smaller than the air volume before the first fan rotation speed.

\* \* \* \* \*